United States Patent [19]

Hoefelmayr et al.

[11] 4,320,718
[45] Mar. 23, 1982

[54] RUBBER TEAT HOLDER

[75] Inventors: Tilmann Hoefelmayr, Niederteufen, Switzerland; Jakob Maier, Türkheim, Fed. Rep. of Germany

[73] Assignee: Biomelktechnik Swiss Hoefelmayr & Co., Niederteufen, Switzerland

[21] Appl. No.: 195,262

[22] Filed: Oct. 8, 1980

[30] Foreign Application Priority Data

Oct. 10, 1979 [DE] Fed. Rep. of Germany ....... 2941150

[51] Int. Cl.³ .............................................. A01J 5/06
[52] U.S. Cl. ................................. 119/14.47; 119/14.5
[58] Field of Search ............... 119/14.47, 14.48, 14.49, 119/14.50, 14.51, 14.52, 14.36, 14.31, 14.5

[56] References Cited

U.S. PATENT DOCUMENTS 2,744,496  5/1956  Roben .............................. 119/14.47

FOREIGN PATENT DOCUMENTS 936724  11/1955  Fed. Rep. of Germany ... 119/14.49
1036562  8/1958  Fed. Rep. of Germany ... 119/14.47
2504605  8/1976  Fed. Rep. of Germany ... 119/14.47

*Primary Examiner*—Hugh R. Chamblee
*Attorney, Agent, or Firm*—Blanchard, Flynn, Thiel, Boutell & Tanis

[57] ABSTRACT

A rubber teat holder has a head portion rotationally symmetrical with respect to a longitudinal axis and with an inlet opening for the teat, and has a holding edge for gripping over a milking cup sleeve. The head portion is formed by a wall which first gradually enlarges radially from said inlet opening in a direction along the longitudinal axis and then tapers back to a flexible suction sleeve which is connected to the head portion and is slightly conical or substantially cylindrical. Upon application of an axial force on the edge of the inlet opening the upper enlarging part of the head portion, which forms a flexible lip at the inlet opening, can move relative to the lower tapering part of the head portion around a part of the head portion, which part acts as a first spring joint. The first spring joint is formed by the wall portion approximately at the maximum outside diameter of the head portion. The wall acts as a second spring joint in the lower end of the tapering part of the head portion, at the height of a cross plane perpendicular to the longitudinal axis, in response to axial pressure on the inlet opening of the teat holder. The wall portion between the first and second spring joints is pivotable about the second spring joint like a lever of approximately constant length, under enlargement of the outside diameter of the head portion. The connecting line which (as viewed in central cross section) connects the first and second spring joints defines an angle not greater than 45° with the cross plane. The mean diameter of the tapering head portion is smaller at the level of the second spring joint than the largest inside diameter of the milking cup sleeve.

16 Claims, 6 Drawing Figures

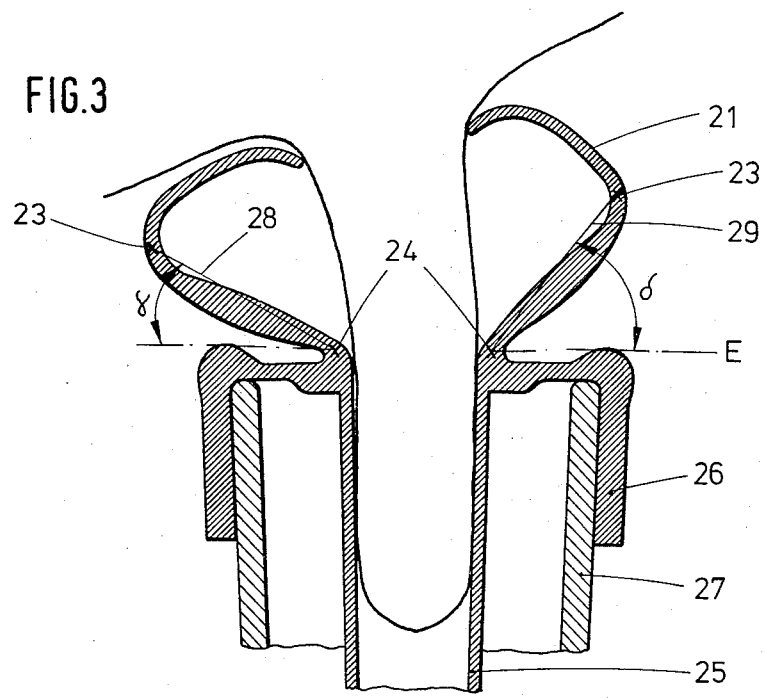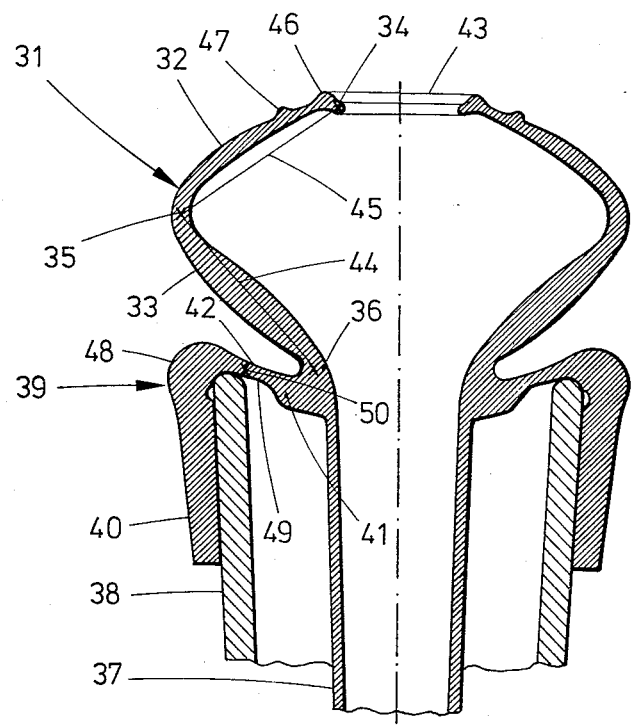

RUBBER TEAT HOLDER

FIELD OF THE INVENTION

The invention relates to a rubber teat holder having a head portion, which is rotationally symmetrical with respect to a longitudinal axis and includes an inlet opening for the teat, and further having a holding edge for gripping over a milking cup sleeve, wherein the wall which encloses the inside of the head portion is constructed such that the inside first gradually enlarges radially from the inlet opening of the teat holder in a direction along the longitudinal axis and then tapers back into a flexible suction sleeve which is connected to the head portion and is slightly conical or cylindrical, whereby in response to an axial force on the edge of the teat inlet opening, the upper enlarging part of the head portion, which adjoins the inlet opening and forms a flexible lip, can move against the lower tapering part of the head portion, around a part of the head portion which acts as a first spring joint.

BACKGROUND OF THE INVENTION

In a milking machine, the rubber teat holder forms the contact point between the animal to be milked and the milking machine and thus represents the most difficult part of the entire milking machine. Particular problems thus arise in particular with respect to the head portion of a rubber teat holder. Such a head portion must fulfill at least two main conditions, namely it must on the one hand assure good sealing on the teat and on the other hand it must be able to adjust well to the many different teat sizes, without applying excessive pressure on the teat. A particularly good sealing is needed to avoid entrance of leakage air and to prevent the entire milking cup from falling off the teat in consequence. The problem of falling off is particularly acute if the milking vacuum is adjusted relatively low. However, this low vacuum, according to newer scientific knowledge, has especially important milking-physiological advantages, and clear advantages with respect to the teat treatment, compared with a high milking vacuum.

The mostly sporadic entrance of leakage air into the head portion of the rubber teat means an undesired drop in the vacuum which is needed for the milking operation. The vacuum drop which is caused by the entrance of leakage air, however, cannot simply be balanced by operating the milking machine as a whole with a higher vacuum pump output, because the occurrence of leakage air as such means already an influence on the milk quality, since turbulences are formed in the milk due to the entering leakage air, which damages the milk structure and thus reduces the milk quality.

Moreover, the entrance of leakage air also endangers the health of the udder. More particularly, one of the teats of an udder often already has mastitis. If now air enters at such a diseased teat, the consequence is that, due to the suddenly occurring pressure difference, the milk from the diseased teat reaches through the collecting piece to the healthy teat. As has been shown in experiments, the thus-occurring milk mist has such a speed that the streak canal on the healthy teat has these milk droplets smoothly flow through same.

Practically in conflict with the requirement of good sealing of the head portion on the teat is the second requirement, that the head portion must adjust simultaneously to the many various teat sizes, teat forms, teat positions and teat conditions, without influencing the teat. Special consideration must thus be given to the fact that especially the tissue at the base of the teat is particularly sensitive, because especially in this area end many nerves which are influential in the stimulation of the animal. However, it is just in this area of the base of the teat that the sealing off of the head portion against the teat must occur. Therefore, as a main requirement must be seen the demand that excessive pressure must not be applied at the base of the teat at the level of the annular fold (Fürstenbergschen Venenringes), since otherwise this annular fold would close prematurely and thus considerably increase the amount of finish milking. Since the finish milking takes up the largest portion of the necessary routine work per cow, an increased finish-milking amount has an important economic influence. However, yet more important is that poor emptying of the udder has a very negative effect on the course of the lactation curve, namely on the entire product output of the cow. In addition, poorly emptied udders are to a higher degree susceptible to mastitis.

Thus, in conclusion, the rubber teat holder is required to make possible, on the one hand, an optimum sealing and adhesion of the milking cup on the teat and, on the other hand, a quick, gentle, as complete as possible and as automatic as possible emptying of the udder.

Many different rubber teat holders are known, which meet these demands either not at all or only insufficiently. A good capability of adjusting to teats of different sizes is already offered by the large head—flat head—rubber teat holder known from U.S. Pat. No. 2,744,496. In this conventional rubber teat holder, the upper part of the head portion is formed by a flat ring lip with a relatively large outside diameter. This large sealing lip (which is flat or level in its initial position) has the advantage that, when teats of different thickness are introduced into the inlet opening, the lip is bent correspondingly inwardly into the head portion. The sealing lip, which is mounted on its outer edge, can be bent easily inwardly due to its relatively large outside diameter. This causes the inlet opening enclosing the teat to be enlarged, so that even for thicker teats only a small radial pressure is applied to the teat. Such a flat head with a relatively large outside diameter has, however, important disadvantages.

In order for the advantages of the large outside diameter ring lip to be effective during introduction of a teat, the head portion must have a relatively large axial structural height, so that the ring lip can be swung also sufficiently inwardly and downwardly to admit teats of different thickness, without the ring engaging the lower part of the head portion. However, such a large head height has the disadvantage that short teats practically find no hold in the rubber teat holder. Furthermore due to the large diameter of the head portion, reciprocal interferences of the milking cups at the udder can result with very closely positioned teats, which results in a poor udder emptying and mostly in a falling off of the milking cups. These flat-head cups of large diameter have the further disadvantage that the cups fall off due to the leakage air when the milking cup cannot be attached to the teat so that the plane of the flat head extends parallel to the bottom of the udder. This is often the case when, for example, the teats are inclined on the udder or also when the udders are very wide or also in the case of ball or step udders. In these cases the teat cup, due to its weight, tends to position itself so that its longitudinal axis extends vertically. If hereby one side of the upper edge of the head portion comes to rest on the udder bottom, then the danger is that the milking cup may tilt and the ring lip deform at the teat or at the udder bottom, such that leakage air can enter. These problems are particularly great when the udder bottom is still hard and unelastic after calfing or when the teats are particularly thin.

A better capability of adjustment to the above-indicated conditions is shown by a rubber teat holder with an approximately semispherical upper head portion, as it has become known for example from German Pat. No. 936 724. However, this conventional round head portion has the disadvantage that during the introduction of different thickness teats, the ring lip which encloses the inlet opening is swung inwardly. However, during this inward swinging of the ring lip, contrary to the above situations described in connection with the flat head, the inlet opening is not enlarged but further narrowed down, so that the teat is practically clamped in, or pinched in, by a narrowing-down ring. Rubber teat holders with such a round head are therefore mostly only usable for teats having a very specific thickness and form in order to achieve somewhat acceptable milking results. For teats of different thickness, practically in each case different rubber teat holders must be used. This, however, is not acceptable for practical milking operations or from the standpoint of economics.

As a logical consequence, one has therefore tried with the rubber teat holder known from German Pat. No. 1 036 562 to maintain the advantages of a round head portion by constructing the upper sealing lip particularly elastically. Said lip is intended to be so elastic that it rolls in easily during the introduction of different thickness teats, without applying significant pressure to the teat. This, however, requires an extremely difficult material tuning for the sealing lip, because if the material is too hard, a considerable pinching in of the teat occurs, while if the material is too soft the danger exists that the milking cup may fall off from the teat. Even if, however, the material is measured correctly at the start, it has been found in practice that after some use the material characteristics change and the sealing lip mostly becomes too soft, which increases the tendency of the milking cups to fall off from the teat. Such a rubber teat holder is in particular unfavorable also for short teats, since the possibility of the strong rolling in of the sealing lip requires as a whole a relatively large head portion height so that small teats no longer find a hold in the mentioned rubber teat holder. However, even for sufficient length teats, the disadvantage exists that only poor or practically no tissue support against the action of the vacuum exists over a large length of the teat, since the teat hangs nonsupported over a relatively large length in the high head portion and swells accordingly. Aside from the mentioned disadvantages, it has been found in practice that the thin elastic rollable lip is extremely sensitive to material tears, wears very quickly, and is damaged very easily during the rough use on the farm.

Therefore, the basic purpose of the present invention is to further develop the rubber teat holder of the above-mentioned type according to German Pat. No. 1 036 502, which rubber teat holder has a round head portion, so that its capability of adjusting to different thickness teats is improved.

This purpose is inventively attained (1) by the first spring joint being formed by the wall portion which lies approximately at the level of the maximum outside diameter of the head portion; (2) by the wall portion in the lower tapering head part, at the level of a cross plane perpendicular to the longitudinal axis, acting as a second spring joint in response to axial pressure on the inlet opening of the teat holder, the wall portion extending between the first and second spring joints being pivotable about the second spring joint during enlargement of the outside diameter of the head portion, like a lever of approximately constant length; (3) by the connecting line (viewed in central cross section) between the first and second spring joints defining an angle of less than or equal to 45° with the cross plane; and (4) by the mean diameter of the tapering head part being smaller at the level of the second spring joint than the largest inside diameter of the milking cup sleeve.

This makes possible a particularly small round head portion, which head portion permits a superb capability of adjustment to extremely differing teat positions and udder forms, without causing the danger of falling off or entrance of leakage air.

If one makes the angle between the first and second spring joint larger than 45°, then the lower part of the head portion becomes so stiff, being practically a cone-shaped shell, that axial pressure on the head portion can no longer effect an active enlargement of the outside diameter of the head portion. Thus, pivoting of the lower wall portion of the head portion could no longer take place. In such a configuration, a small enlargement of the outside diameter of the holder could be made possible only by radial pressure on the upper sealing lip during introduction of the teat past the sealing lip. However, this radial pressure acts back fully onto the teat, so that in such a configuration a pressure relief of the teat can no longer take place. In contrast, the inventive construction, wherein the angle between the first and second spring joints is chosen smaller or at most equal to 45° and preferably is between 45° and 20°, achieves enlargement of the maximum outside diameter of the head portion in response to axial pressure acting through the two spring joints and the therebetween-lying relatively longitudinal-pressure-resistant wall portion, due to outward pivoting of said wall portion. The smaller the mentioned angle, the easier is the outward pivoting of such wall portion in response to axial pressure on the head portion. Radial pressure on the teat is thus relieved in the present invention.

Such radial pressure relief is achieved by the present invention in particular also toward the end of milking. The teat usually becomes softer as the milking time continues. This usually reduces the sealing action which exists at the beginning between the teat and the suction sleeve, so that the vacuum in the head cavity of the rubber teat holder increases more and more. Due to the resulting change in pressure difference between the outside atmosphere and the pressure inside of the head cavity, the relatively soft upper ring lip is pressed axially downwardly. Due to the pressure difference, in the case of a flat-head rubber teat holder, said operation results in an enlargement of the opening and thus entrance of leakage air. In contrast, in the case of a round-head rubber the teat inlet opening is further narrowed down, so that in the case of the up-to-now common round-head rubber teat holders a further additional constriction of the teat actually results. However, in the inventive rubber teat holder further pressure relief is achieved due to the pivoting of the lower head part outwardly. The degree of the desired pressure relief can be selected easily by selecting the length of the distance between the first and the second spring joint and by selecting the angle between the connecting line between said spring joints and a cross plane perpendicular to the longitudinal axis of the rubber teat holder. The larger the distance is between the first and second spring joints, the larger is (under otherwise the same conditions) the relieving action. The flatter the mentioned angle, the easier is the reaction of the system to a changing pressure difference between the outside atmosphere and the inside pressure in the head cavity, or to an axial pressure on the upper end of the head portion of the rubber teat holder. A relief is thus achieved according to the invention especially due to its geometric and structural characteristics.

The rubber teat holder of the invention can be constructed both as a rubber teat holder for a two-chamber cup and also for a one-chamber cup. Usually in the case of a rubber teat holder for a one-chamber cup, one does not need a suction sleeve connected to the head portion, since in this case the inner wall of the suction sleeve is usually replaced with the inner side of the cup sleeve. In a one-chamber cup it is advantageously true that the mean diameter of the tapering part of the head portion is smaller at the height of the second spring joint than 1.5 times the inner suction sleeve diameter. The inside diameter of the suction sleeve is hereby supposed to be determined by measuring at a distance of the maximum head diameter from the upper end of the head portion. This condition results from the general condition that the mean diameter of the tapering part of the head portion is smaller at the height of the second spring joint than the maximum inside diameter of the cup sleeve, if one for example assumes that in a normal milking cup sleeve the maximum inside height measurement is approximately 39 mm. and the suction sleeve has approximately an inside diameter of 26 mm.

The inventive rubber teat holder both for a one-chamber and also for a two-chamber cup has the advantage that the advantages of a round head are maintained, so that the danger of the occurrence of leakage air can be avoided even in the case of the most unfavorable teat positions and udder forms. This advantage is achieved even more since the invention permits manufacture of a round head portion with a specially small maximum diameter. However, it is particularly advantageous that, in spite of the utilization of the advantages of a round head, the capability of adjusting to teats of different thickness and different length is substantially improved. Due to the fact that the possibility is created that the maximum outside diameter of the head' portion can increase when teats with different thickness are introduced into the head portion, it is achieved that also in the case of thicker teats practically no greater pressure is applied onto the teat than in the case of thinner teats. This is extremely important for the willingness of the animal to give the milk at all. These advantages are achieved even though the inventive head portion can be constructed especially small and the head height can be constructed very low, so that the rubber teat holder is suitable also for extremely short teats.

These advantages are achieved in a special degree when the second spring joint is arranged at the transition of the tapering part of the head portion into a nozzle (a shortened suction sleeve).

In this last case, the holding edge is advantageously connected directly below the second spring joint to the nozzle. This keeps as short as possible the length of teat engaging the nozzle, wherein no massaging movement is applied by the nozzle to the teat, in that the nozzle is substantially reinforced and practically rigid.

The head portion is advantageously further developed by making the angle (in central cross section) between the first connecting line (between the first and the second spring joint) on the one hand and a second connecting line (between the inside edge of the inlet opening and the first spring joint) on the other hand smaller or equal to 90°. If this angle is exceeded, then the disadvantage results on the one hand that the height of the head portion becomes larger than desired, and on the other hand that the wall of the head portion increasingly proves to be practically stiff with respect to an axially acting force and it forms a cone-shaped surface making an acute angle to the longitudinal axis. For this reason, the angle between the second connecting line, and a cross plane perpendicular to the longitudinal axis, is also preferably chosen smaller than or equal to 45°. In a particularly advantageous embodiment, the radius of curvature of the inside wall at the transition of the tapering part of the head portion into the suction sleeve, or nozzle, is between 1/5 and ½ of the diameter of the nozzle. This contributes to keeping the height of the head portion as small as possible and supports the teat at as small as possible a distance from the teat inlet opening. According to a preferred exemplary embodiment, the radius of curvature lies between 5 and 10 mm.

To improve the sealing off of the sealing lip of the head portion, one or several sealing ribs are provided concentrically to the inlet opening around same on the outside of the head portion.

Furthermore, when the holding edge for gripping over the milking cup sleeve is constructed (as seen in central cross section) angularly with two legs, of which the first leg has the free end and rests against the outside of the milking cup sleeve, it is advantageous to make the second leg so flexible that the head portion can move axially with respect to the milking cup sleeve, in response to a pressure difference which occurs between the outside and the space between milking cup sleeve and suction sleeve and acts on the second leg. This contributes considerably to the stimulation of the animal, since at every pulsation cycle the milking cup sleeve is moved longitudinally relative to the teat. This up-down movement is particularly advantageous, when in the case of four teats each two milking cups are switched in push-pull, so that a reciprocal rocking movement is obtained practically on the two pairs of teats, which rocking movement simulates the movement carried out by hand during manual milking.

To avoid a breaking through of the holding edge of the rubber teat holder due to hitting of an object, and merely due to the up and down movement of the milking cup sleeve during the milking cycle, the inside diameter of the holding edge is preferably of thickness increasing from the free end of the holding edge, so that the holding edge part, which in mounted condition grips over the uppermost edge of the milking cup sleeve, has in nonmounted condition an inside diameter larger than or equal to the outside diameter of the milking cup sleeve edge. In addition, it is advantageous to reinforce the holding edge part which grips over the uppermost milking cup sleeve edge.

BRIEF DESCRIPTION OF THE DRAWINGS

The invention is discussed in greater detail hereinafter in connection with preferred exemplary embodiments, which are illustrated in the drawings, in which:

FIG. 3 is a central cross-sectional view of a further embodiment of an inventive rubber teat holder, which is attached to a teat which hangs at an incline, FIG. 4 is a central cross-sectional view of a further embodiment of an inventive rubber teat holder.

DETAILED DESCRIPTION

Figure 1:
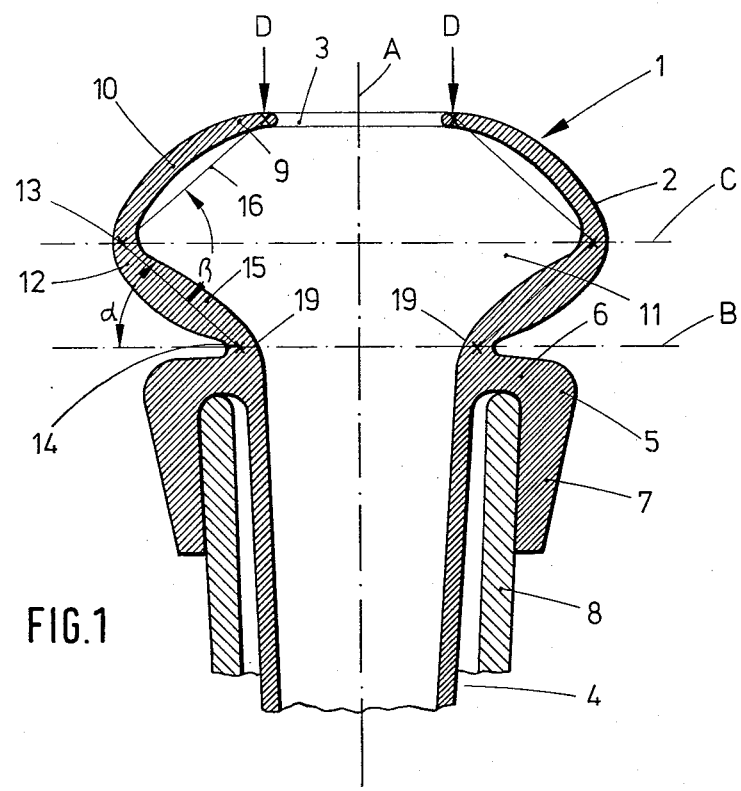
FIG. 1 is a central cross-sectional view of a first embodiment of an inventive rubber teat holder, which is mounted on a milking cup sleeve.
Figure 2:
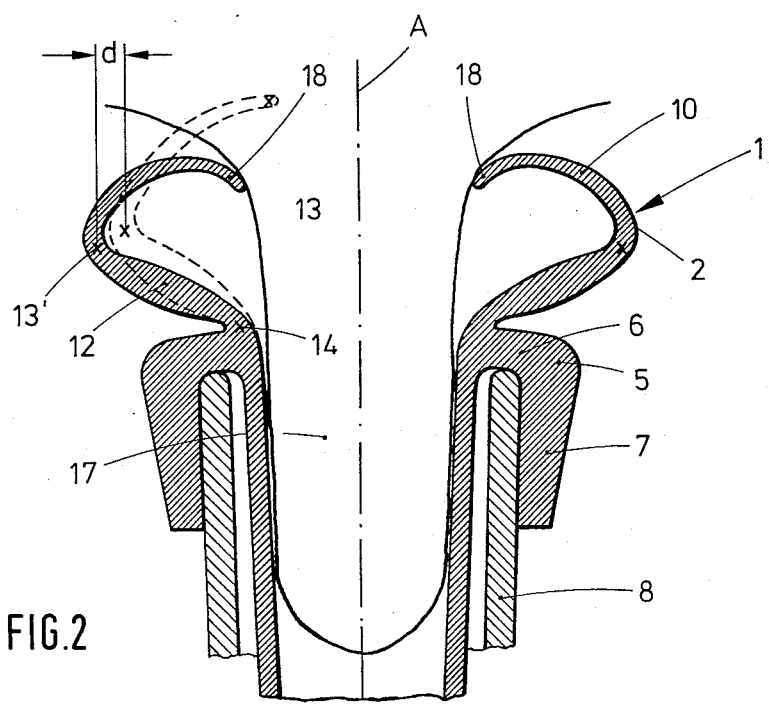
FIG. 2 illustrates the rubber teat holder shown in FIG. 1, with a teat introduced thereinto, while the left portion of the figure shows in dashed lines the head portion in its unloaded condition corresponding with FIG. 1.

FIGS. 1 and 2 illustrate a rubber teat holder which in general is identified by reference numeral 1 and which is rotationally symmetrical about its longitudinal axis A. The rubber teat holder 1 forms the rubber teat holder for a two-chamber cup and consists substantially of a head portion 2, at the upper end of which is constructed an inlet opening 3 for a teat, a suction sleeve 4 which is connected to the head portion 2 and which is constructed cylindrically or slightly conically, and a holding edge 5, which in the present exemplary embodiment is constructed angularly and comprises a first leg 6 which is connected to the suction sleeve 4 and a second leg 7 which rests against the outside of a milking cup 8.

The head portion 2 has an upper head part 9, which is enclosed by an elastic lip 10. The elastic lip 10 contains the inlet opening 3, and extends from the inlet opening 3 arcuately outward and then downward to form sides at its maximum outside diameter in the cross plane C. Starting out from the inlet opening 3, the lip 10 thus encloses a space which progressively enlarges radially in direction of the longitudinal axis A. The lower part 11 of the head portion 2 is formed by a wall portion 12 connected to the lip 10. The wall portion 12 is constructed such that the inside of the head portion 2 tapers down again from a maximum diameter at the level of the plane C gradually along the longitudinal axis A, until, practically at the level of the cross plane B, it merges with the suction sleeve 4.

The head portion 2 is designed such that with axial pressure on the head portion at the inlet opening 3, as indicated by the arrows D, a first spring joint 13 is formed in the cross plane C, namely in the plane through the maximum circumference of the head portion 2 and perpendicular to the longitudinal axis A, and a second spring joint 14 is formed in the cross plane B, at the transition of the head portion 2 into the suction sleeve 4. This can be done for example by suitably forming the wall of the head portion 2 at the corresponding planes or by suitably choosing the material used for such wall. The term spring joint is here intended to express that about a pivot point (in reality of course this invention deals with spring joints joining annular surfaces) occurs a reciprocal pivoting of the adjoining wall portions like in a hinge, but that during this pivoting, spring moments simultaneously occur at the pivot point. The wall portion 12, which lies between the first and the second spring joints 13 and 14, is advantageously constructed such that during a pivoting of said wall portion 12 about the second spring joint 14, a shortening of the distance between the first and the second spring joints 13 and 14 does not occur, which for example could happen due to a collapse of the wall portion 12. To prevent this, the wall portion 12 must have a suitable stiffness.

The angle $\alpha$, which the connecting line 15 between the first and second spring joints 13 and 14 forms with the cross plane B, preferably does not exceed 45°, since at angles over 45° the wall portion 12 (which forms a practically conical surface) stiffens increasingly such that, even with increasing axial pressure on the inlet opening 3, pivoting of the wall portion 12 about the second spring joint 14 is no longer possible.

The angle $\beta$ between the connecting line 15 and the center line 16, which connects the first spring joint 13 to the inside edge of the inlet opening 3, is preferably no larger than 90°. On the one hand, the elastic lip 10 also forms a practically conical surface, and thus is increasingly more difficult to bend inwardly when half the angle subtended by the cone is less than 45°. On the other hand, if the angle $\beta$ were larger than 90°, and the angle $\alpha$ less than or equal to 45°, the connecting line 16 would automatically define an angle larger than 45° with the cross plane C, which would mean an unnecessary increase of the height of the head portion 2 (namely extension along the longitudinal axis A), without achieving through this more steep extent of the elastic lip 10 substantial additional advantages with respect to the adjustment of the head portion to inclined positioned teats or unfavorable udder configurations.

FIG. 2 illustrates how the head portion 2 of the rubber teat is deformed by introducing of a teat 17 thicker than the inlet opening 3. The areas 18 of the elastic lip 10, which areas are adjacent to the inlet opening 3, are thereby bent inwardly and downwardly. The elastic lip 10 is thereby at the same time pivoted about the first spring joint 13. At the same time, a force thereby acts axially on the first spring joint 13, and pivots same about the second spring joint 14 in such a manner that the first spring joint 13 reaches the position shown at 13' in FIG. 2. Due to the pivoting of the wall portion 12 about the second spring joint 14, the maximum outside diameter of the head portion 2 is thus enlarged. As can be seen from FIG. 2, the first spring joint 13 has expanded by the amount of stretch d radially outwardly to the spring joint position 13'. Thus as a whole, the maximum diameter of the head portion is enlarged by the amount 2d. Thus, the inlet opening 3 for the teat is enlarged correspondingly, so that there occurs a considerable relief of the pressure applied to the teat by the elastic lip 10.

As has been discussed above, the angle $\alpha$ is not to exceed a maximum of 45°, since otherwise excessive force must be applied to achieve any pivoting of the wall portion 12 about the second spring joint 14. However, in order to achieve as large an amount of the radial expansion d as possible with a small angle $\alpha$, the length of the connecting line 15 between the first and second spring joints should be as large as possible. This can be achieved, while keeping as small as possible the maximum outside diameter of the head portion, by the second spring joint 14 being shifted as far as possible from the first spring joint 13 in the direction toward the suction sleeve 4. Therefore, in an optimum case the second spring joint 14 should be arranged at the level of the transition of the head portion 2 into the suction sleeve 4. This transition is constructed relatively abruptly according to the exemplary embodiment illustrated in FIGS. 1 and 2, so that the mean diameter of the second spring joint 14 becomes smaller than the maximum inside diameter of the milking cup sleeve 8. The means diameter is here considered to be the arithmetic mean between the outside and inside diameter of the head portion 2 at the height of the second spring joint 14. The relatively abrupt transition between the inside wall of the head portion 2 and the inside wall of the suction sleeve 4 here means a transition having a radius of curvature which lies between 1/5 and ½ the diameter of the suction sleeve 4. According to a preferred exemplary embodiment, the radius of curvature of the just-mentioned transition area 19 lies between 5 and 10 mm.

A certain stiffening of the suction sleeve 4 is provided by the holding edge 5 and the leg 6, which is connected to said suction sleeve 4 at the transition of the holding edge 5 into the suction sleeve. A massaging of the teat is achieved only in the part of the suction sleeve which lies below the leg 6 of the holding edge 5. In order to keep as small as possible the teat supporting section of the suction sleeve in which no massaging of the teat occurs, the holding edge 5 is attached to the suction sleeve 4 directly below the second spring joint 5.

FIG. 3 shows how the inventive rubber teat holder simultaneously improves the adhesion and prevention of the occurrence of leakage air. Reference numeral 21 identifies the head portion of a rubber teat holder, which is closely connected to a suction sleeve 25. A holding edge 26 is mounted on the suction sleeve 25, which edge grips over the milking cup sleeve 27. A teat which projects away from the udder at an incline is introduced into the rubber teat holder. As can be seen from FIG. 3, the udder hangs down farther on the left side of the teat than on the right side. Accordingly, the left part of the upper portion 21 in FIG. 3 rests sooner against the udder than the right part. In spite of this, good adhesion is possible also in this case, which is achieved by the entire head portion 21 actually being able to tilt to a certain degree relative to the milking cup sleeve 27 and the suction sleeve 25. As can be seen from FIG. 3, the plane in which the first spring joint 23 actually lies is tilted relative to the cross plane E, which is perpendicular to the longitudinal axis of the suction sleeve 25. This is made possible by reducing the angle $\gamma$ between the cross plane E and the connecting line 28 between the first spring joint 23 and the second spring joint 24 on the left side relative to the initial position of the head portion 21, while a corresponding angle $\delta$ on the right side is enlarged with respect to such initial position. This in turn is made possible by the pivotally of the head portion 21 about the second spring joint 24.

In the embodiment illustrated in FIG. 4, the head portion, generally identified by reference numeral 31, is formed of an elastic lip 32 which encloses the upper part of the head portion and a wall portion 33 which encloses the lower part of the head portion. This lower wall portion 33 transfers into the suction sleeve 37. The elastic lip 32 encloses the opening 43. A first spring joint 35 is formed at the height of the maximum outside diameter of the head portion, while a second spring joint 36 is formed at the transition of the wall portion 33 into the suction sleeve 37. In this exemplary embodiment, the connecting line 44 between the first and the second spring joints 35 and 36 defines an angle of approximately 45° with a not-shown cross plane perpendicular to the longitudinal axis of the head portion. The connecting line 45 between the first spring joint 35 and the inside edge 34 of the opening 43, however, defines an angle smaller than 45° with said cross plane. The length of the connecting line 44 is correspondingly slightly larger than the length of the connecting line 45. Around the inlet opening 43 on the outside of the elastic lip 32 there are constructed first and second sealing ribs 46 and 47. These are intended to seal against the udder bottom. The arrangement here shown responds to an axial inward pressure on the edge 34 of the inlet opening 43 particularly strongly relieving the radial pressure on the teat.

In FIG. 4, the holding edge, generally indicated at 39, is attached directly below the second spring joint 36 on the suction sleeve 37. The holding edge 39 comprises a first leg 40, which rests against the outside of the milking cup sleeve 38, and a second leg 41, which connects said first leg to the suction sleeve 37. To assure a better holding capability of the holding edge 39, a thickened portion 48, which lies above the uppermost edge of the milking cup sleeve 38, is constructed at the level of the transition point from the first leg 40 to the second leg 41.

In the illustrating exemplary embodiment, the mean diameter of the second spring joint 36 is substantially smaller than the inside diameter of the milking cup sleeve 38. Due to this construction, atmospheric pressure acts constantly during operation on the surface 42 of the second leg 41 of the holding edge, and said surface 42 is opposite the surface 49 on the second leg 41, onto which acts the pulsator pressure in the space between the outside of the suction sleeve 37 and the inside of the milking cup 38. Due to the resulting pressure difference, which changes cyclically and acts on the second leg 41, the second leg 41 is pivoted periodically clockwise and counterclockwise practically about a third spring joint 50 which lies on the inner edge of the milking cup sleeve 38. This effects all together, since the third spring joint is also constructed annularly, a movement of the head portion 31 and of the suction sleeve 37 of the rubber teat holder axially with respect to the milking cup sleeve 38. If the milking cups which are simultaneously attached to the four teats are operated to alternate in stroke, then this effects a rocking movement, which increases particularly strongly the stimulation of the udder by each of the two pairs of milking cups with respect to one another.

Figure 5:
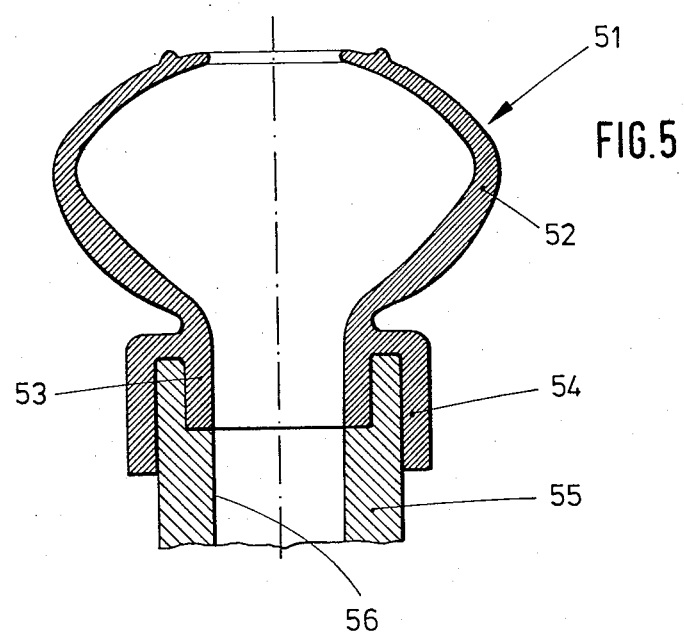
FIG. 5 is a central cross-sectional view of a further embodiment of an inventive rubber teat holder for a one-chamber cup.

FIG. 5 illustrates a rubber teat holder 51 which is constructed for a one-chamber cup. This rubber teat holder consists substantially of a head portion 52, as described in the preceding exemplary embodiments, which in this case, however, transfers only into a relatively short suction sleeve, or nozzle portion, 53. A holding edge 54 is also attached on the nozzle portion 53, which edge 54 grips over the upper edge of the milking cup sleeve 55. The nozzle portion 53 is received in a suitable recess on the inside of the upper edge of the milking cup sleeve 55, such that the inside surface of the nozzle is flush with the remaining inside surface 56 of the milking cup sleeve 55. The inside surface of the milking cup sleeve forms, as a practical matter, the continuation of the nozzle 53.

Figure 6:
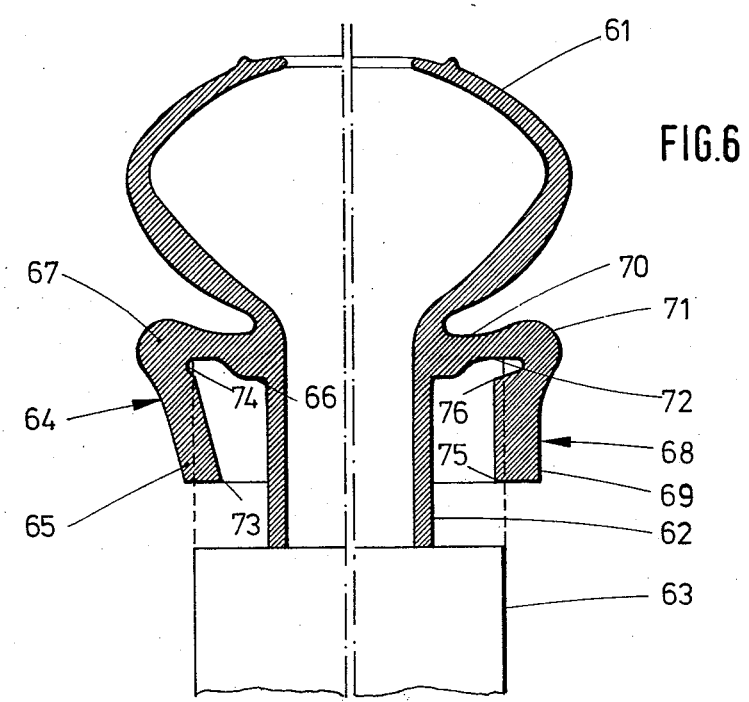
FIG. 6 is a central cross-sectional view of a still further embodiment of an inventive rubber teat holder.

FIG. 6 illustrates on the left and right sides thereof two different embodiments for the holding edge. Just like in the preceding embodiments, a head portion 61 is connected to a suction sleeve 62, on which are attached the first embodiment of a holding edge 64, which embodiment is shown on the left side, or the second embodiment of a holding edge 68, which embodiment is shown on the right side. The milking cup sleeve 63 is illustrated for clarifying purposes in the lower part, onto which sleeve 63 the respective holding edge must be placed.

The holding edge 64 comprises a first leg 65 and a second leg 66 which connects said first leg to the suction sleeve 62. At the transition of the first to the second leg is constructed a thickened portion 67, which is to prevent a breaking through of the holding edge 64 by the upper edge of the milking cup sleeve. As can be seen from FIG. 6, the first leg 65 is constructed such that its inside diameter, starting out from its outer free end, at which the inside diameter is smaller than the outside diameter of the milking cup sleeve 63, increases constantly in such a manner toward its upper end 74 that the inside diameter of said upper end 74 is larger than or at least equal to the outside diameter of the milking cup sleeve 63. This makes the holding edge 64 tension-free especially at said uppermost end 74, at which the holding edge rests on the upper side of the milking cup sleeve 63, since otherwise rapid destruction of the holding edge, especially at said upper end, would occur during operation.

A second holding edge 68 is shown on the right side of FIG. 6, which holding edge 68 similarly comprises a first leg 69, and a second leg 70 which connects said first leg 69 to the suction sleeve 62. In this exemplary embodiment, the inside diameter of the second leg 69, from a lower point 75 to an upper point 76, is smaller than the outside diameter of the milking cup sleeve 63. In the operating condition, this part 75 to 76 of the holding edge 68 thus lies under tension against the outside of the milking cup sleeve 63. Above the point 76 and at the transition of the first leg 69 into the second leg 70, a cavity 72 is provided, which cavity has a larger inside diameter than the outside diameter of the milking cup sleeve 63. This cavity 72 also makes the holding edge tension-free in the transition area between the first and the second legs. The holding edge is also thickened in this transition at 71.

The rubber teat holder is advantageously manufactured of an elastic material. Silicon rubber has proven to be particularly good.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A rubber teat holder having a head portion which is rotationally symmetrical with respect to a longitudinal axis and has an inlet opening for the teat, and a holding edge for gripping over a milking cup sleeve, the head portion being formed by a wall which encloses the inside thereof, the wall being constructed such that it first gradually enlarges radially from said inlet opening in a direction along the longitudinal axis and then tapers back into a flexible suction sleeve which is connected to the head portion and is slightly conical or substantially cylindrical, whereby upon application of an axial force on the edge of the inlet opening the upper enlarging part of the head portion, which part adjoins the inlet opening and forms a flexible lip, can be moved against the lower tapering part of the head portion around a part of the head portion, which part acts as a first spring joint, wherein the improvement is comprised in that the first spring joint is formed by the wall portion which lies approximately at the height of the maximum outside diameter of the head portion, the wall acting as a second spring joint in the lower tapering head portion at the height of a cross plane perpendicular to the longitudinal axis and spaced below said first spring joint in response to an axial pressure onto the inlet opening of the teat holder, the wall portion which lies between the first and the second spring joint being pivotable about said second spring joint like a lever of approximately constant length to enlarge the outside diameter of the head portion, the connecting line which as viewed in axial cross section connects the first and second spring joints defining an angle not greater than 45° with the cross plane, and the mean diameter of the tapering head portion being smaller at the level of the second spring joint than the largest inside diameter of the milking cup sleeve.

2. A rubber teat holder according to claim 1, wherein the wall of the enlarging and the tapering part of the head portion is curved arcuately outwardly, as viewed in central cross section.

3. A rubber teat holder according to claim 1, wherein the wall of the enlarging and the tapering part of the head portion is constructed substantially conical in central cross section.

4. A rubber teat holder according to claim 1, wherein one or several ribs are constructed concentrically of the inlet opening and surround same on the outside of the head portion.

5. A rubber teat holder according to claim 1, wherein the holding edge for gripping over the milking cup sleeve is constructed, as seen in central cross section, angularly with two legs, of which the first leg has a free end and bears against the outside of the milking cup sleeve, and wherein the second leg is constructed flexibly such that the head portion can be moved axially against the milking cup sleeve due to a pressure difference which occurs between the outside and the space between the milking cup sleeve and the suction sleeve and which acts on the second leg.

6. A rubber teat holder according to claim 1, wherein the inside diameter of the holding edge increases from the free end of the holding edge, such that the part of the holding edge, which in mounted condition grips over the uppermost edge of the milking cup sleeve, has in its unmounted condition an inside diameter which is not less than the outside diameter of the milking cup sleeve edge.

7. A rubber teat holder according to claim 1, wherein the part of the holding edge which grips over the uppermost milking cup sleeve edge is reinforced.

8. A rubber teat holder according to claim 1, wherein the second spring joint is arranged at the transition of the tapering part of the head portion with the suction sleeve.

9. A rubber teat holder according to claim 8, wherein the holding edge is connected directly below the second spring joint to the suction sleeve.

10. A rubber teat holder according to claim 1, wherein the radius of curvature of the inside wall at the transition of the tapering part of the head portion into the suction sleeve is between 1/5 and ½ of the diameter of the suction sleeve.

11. A rubber teat holder according to claim 10, wherein said radius of curvature is between 5 and 10 mm.

12. A rubber teat holder having a head portion which is rotationally symmetrical with respect to a longitudinal axis and has an inlet opening for the teat, and a holding edge for gripping over a milking cup sleeve, the head portion being formed by a wall which encloses the inside thereof, the wall being constructed such that it first gradually enlarges radially from said inlet opening in a direction along the longitudinal axis and then tapers back into a flexible suction sleeve which is connected to the head portion and is slightly conical or substantially cylindrical, whereby upon application of an axial force on the edge of the inlet opening the upper enlarging part of the head portion, which part adjoins the inlet opening and forms a flexible lip, can be moved against the lower tapering part of the head portion around a part of the head portion, which part acts as a first spring joint, wherein the improvement is comprised in that the first spring joint is formed by the wall portion which lies approximately at the height of the maximum outside diameter of the head portion, the wall acting as a second spring joint in the lower tapering head portion at the height of a cross plane perpendicular to the longitudinal axis in response to an axial pressure onto the inlet opening of the teat holder, the wall portion which lies between the first and the second spring joint being pivotable about said second spring joint like a lever of approximately constant length, under enlargement of the outside diameter of the head portion, the connecting line which as viewed in axial cross section connects the first and second spring joints defining an angle not greater than 45° with the cross plane, and the means diameter of the tapering head portion at the level of the second spring joint being smaller than the largest inside diameter of the milking cup sleeve wherein, in central cross section, the first connecting line connecting the first and second spring joints and a second connecting line connecting the inside edge of the inlet opening and the first spring joint form an angle therebetween not greater than 90°.

13. A rubber teat holder according to claim 12, wherein the second connecting line and a further cross plane perpendicular to the longitudinal axis form an angle therebetween not greater than 45°.

14. In a rubber teat holder comprising:
    a holding edge for gripping over a milking cup sleeve;
    a flexible suction sleeve which is slightly conical or substantially cylindrical;
    a head portion which is rotationally symmetrical with respect to a longitudinal axis and has an inlet opening for the teat, the head portion being formed by a wall which encloses the space within the head portion, the wall gradually enlarging radially from said inlet opening in a direction along the longitudinal axis and then tapering back into connection with said flexible suction sleeve and holding edge, the upper enlarging part of the head portion, which part adjoins the inlet opening and forms a flexible lip, being responsive to application of an axial force on the edge of the inlet opening for moving toward the lower tapering part of the head portion around a part of the head portion, which latter part acts as a first spring joint;
    the improvement comprised in that the first spring joint is formed by a first annular part of the wall located approximately at the height of the maximum outside diameter of the head portion, a further part of the head portion acting as a second spring joint in response to an axial pressure on the teat holder at the inlet opening, the second spring joint being formed by a second part of the wall located at the height of a cross plane perpendicular to the longitudinal axis and adjacent the bottom of the lower tapering part of the head portion, the part of the wall between the first and second spring joints being pivotable about said second spring joint like a lever of approximately constant length while enlarging the maximum outside diameter of the head portion, the stiffness of the wall part between said first and second spring joints being greater than the stiffness of the wall parts respectively at said first and second spring joints, said wall being circumferentially stretchable in the area of said first spring joint and maximum outside diameter to permit said enlargement of said maximum outside diameter in response to said axial pressure on said teat holder and pivoting of said pivotable wall part, the connecting line which as viewed in axial cross section connects the first and second spring joints defining an angle not greater than 45° with the cross plane, and the mean diameter of the tapering part of the head portion being smaller at the level of the second spring joint than the largest inside diameter of the milking cup sleeve.

15. A rubber teat holder according to claim 14, in which the wall is bendable at the first and second spring joints but not in the leverlike part thereof between said first and second spring joints, said head portion being tiltable as a whole with respect to said suction sleeve by differential bending of diametrally opposite portions of said second spring hinge.

16. A rubber teat holder according to claim 14, in which the thickness of the wall part between said first and second spring joints is greater than the thickness of the wall parts respectively at said first and second spring joints.

* * * * *

UNITED STATES PATENT AND TRADEMARK OFFICE
CERTIFICATE OF CORRECTION

PATENT NO. : 4 320 718
DATED : March 23, 1982
INVENTOR(S) : Tilman Hoefelmayr and Jakob Maier It is certified that error appears in the above—identified patent and that said Letters Patent is hereby corrected as shown below:

Column 12, line 27; after "several" insert ---sealing---.

Column 13, line 29; change "means" to ---mean---.

Signed and Sealed this

Twenty-ninth Day of March 1983

[SEAL]

Attest:

GERALD J. MOSSINGHOFF

Attesting Officer     Commissioner of Patents and Trademarks